Nov. 27, 1945.    A. P. DE SEVERSKY    2,389,600
LIFE BOAT FOR AIRPLANES
Filed May 8, 1942    7 Sheets-Sheet 1
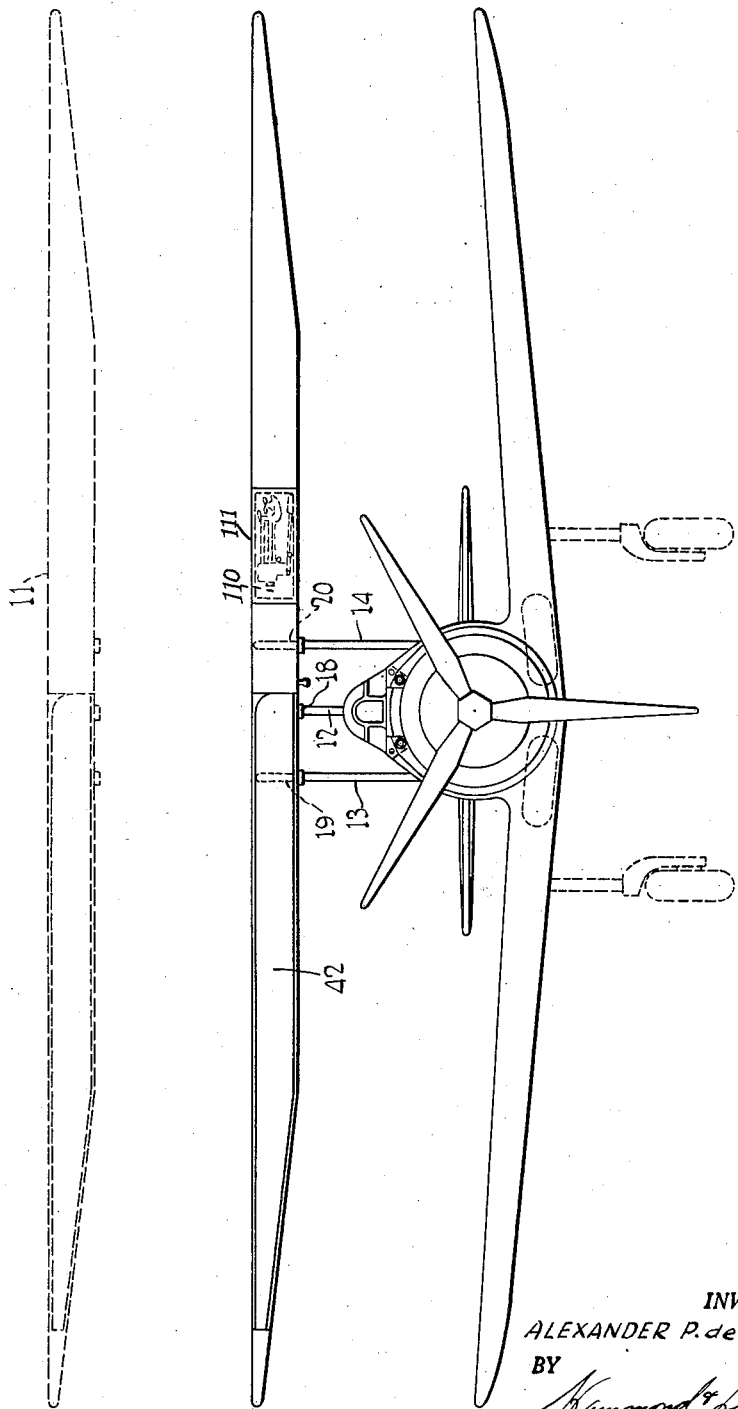
INVENTOR.
ALEXANDER P. de SEVERSKY
BY
ATTORNEYS

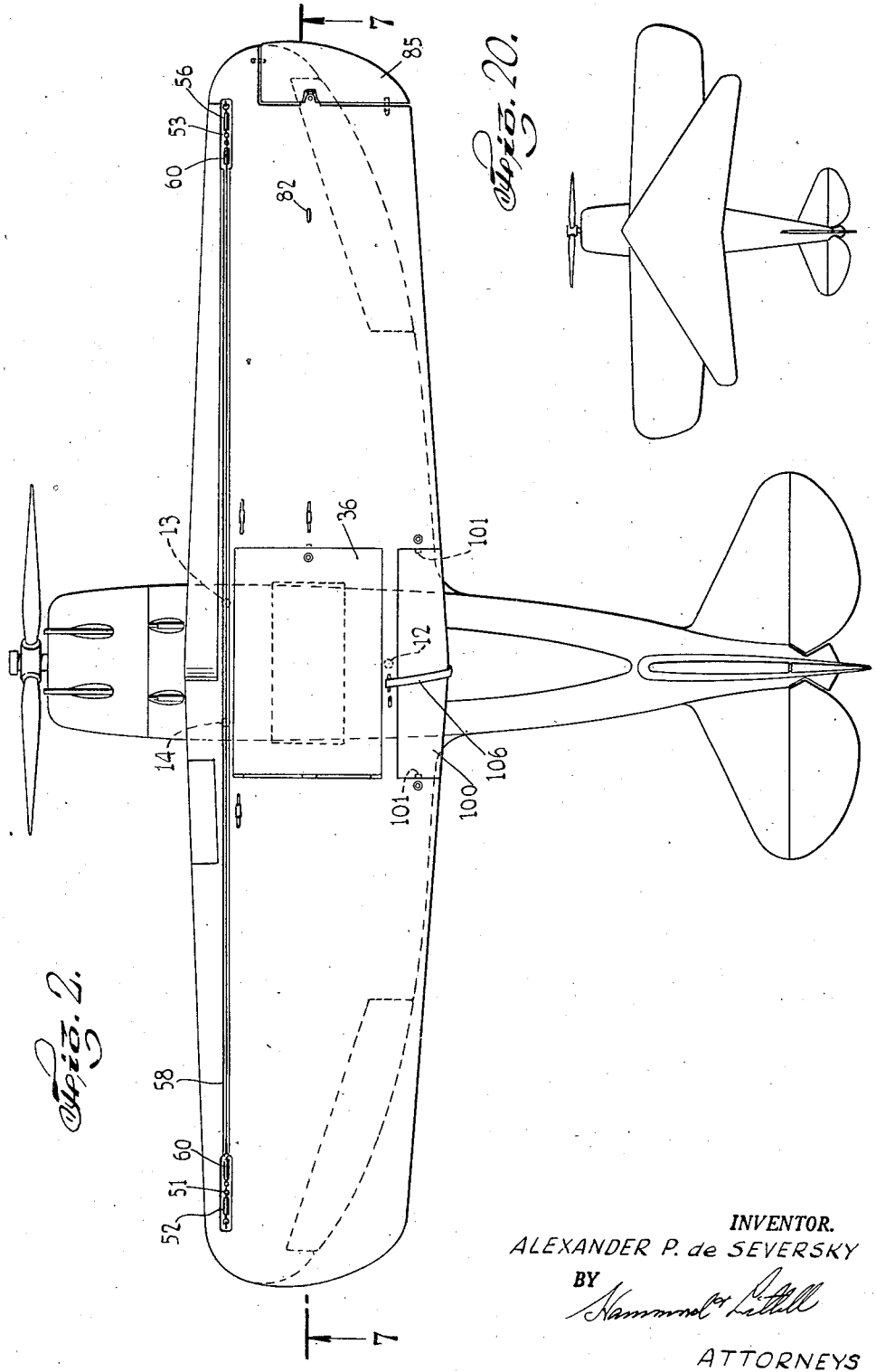

Nov. 27, 1945. A. P. DE SEVERSKY 2,389,600
LIFE BOAT FOR AIRPLANES
Filed May 8, 1942 7 Sheets-Sheet 3
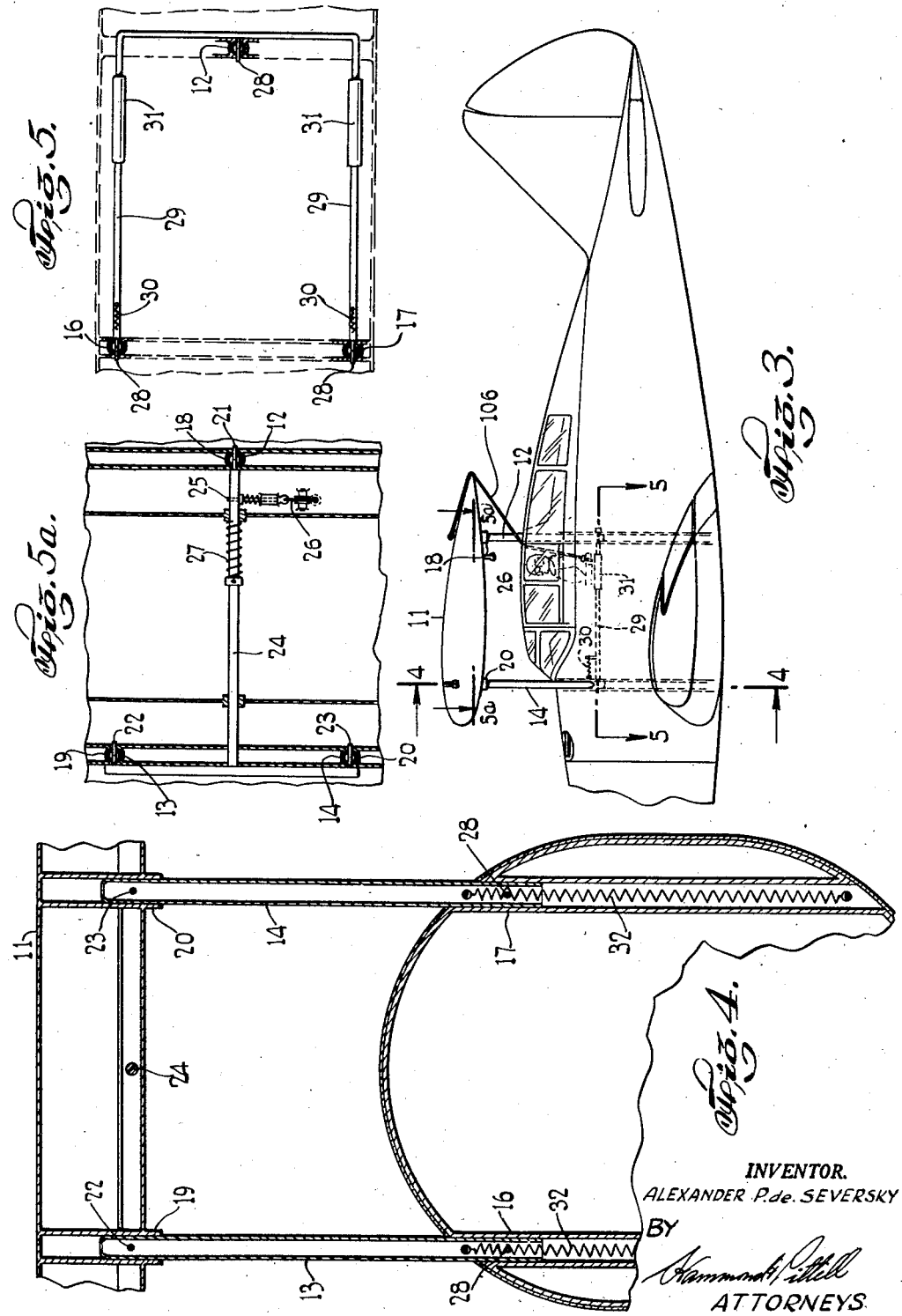
INVENTOR.
ALEXANDER P. de. SEVERSKY
BY
ATTORNEYS

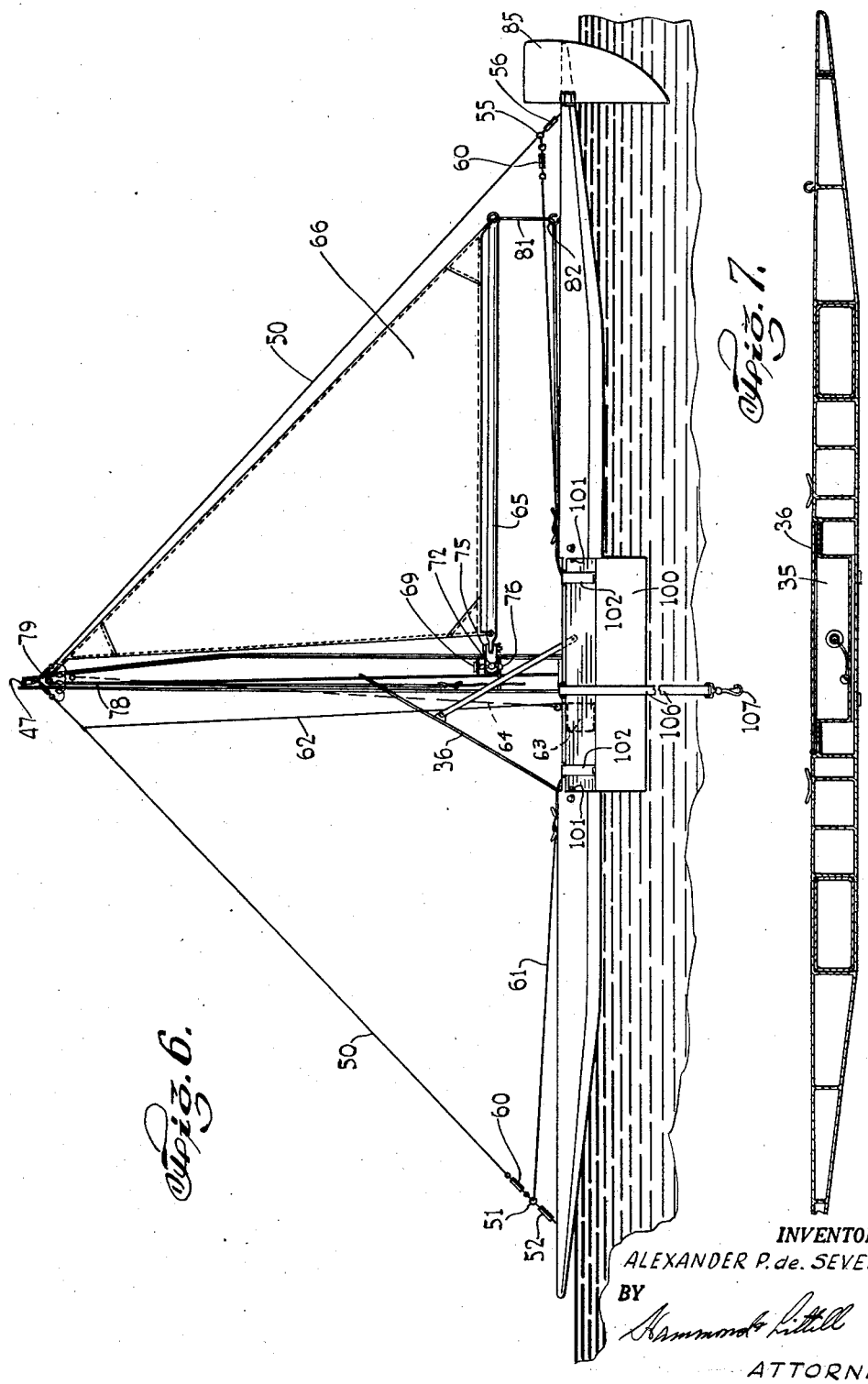

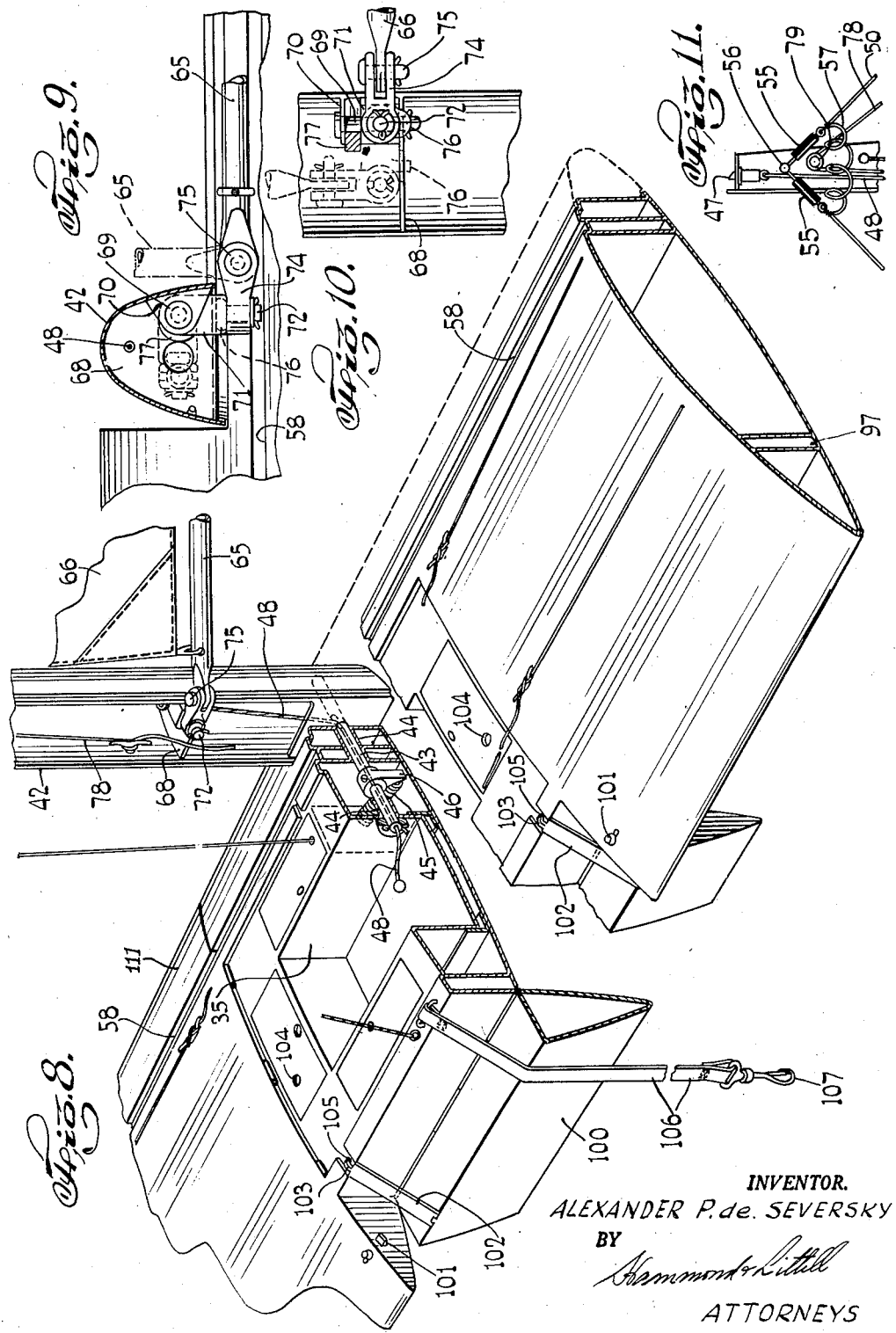

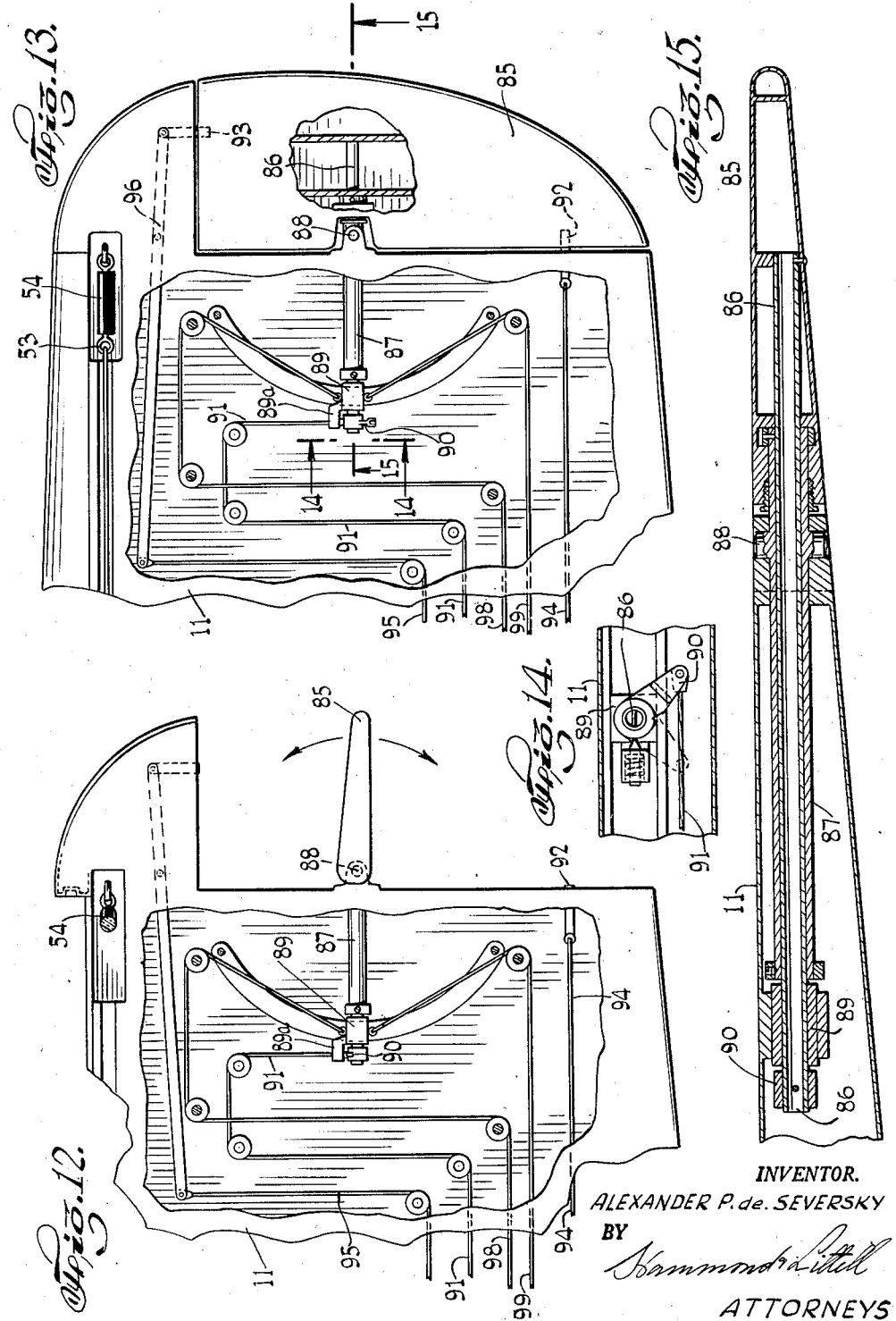

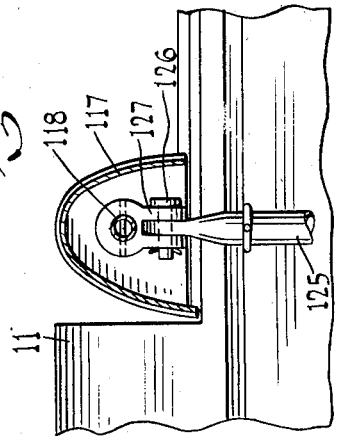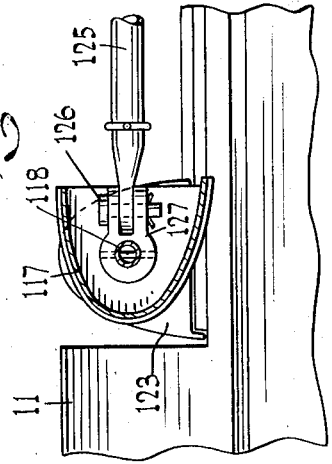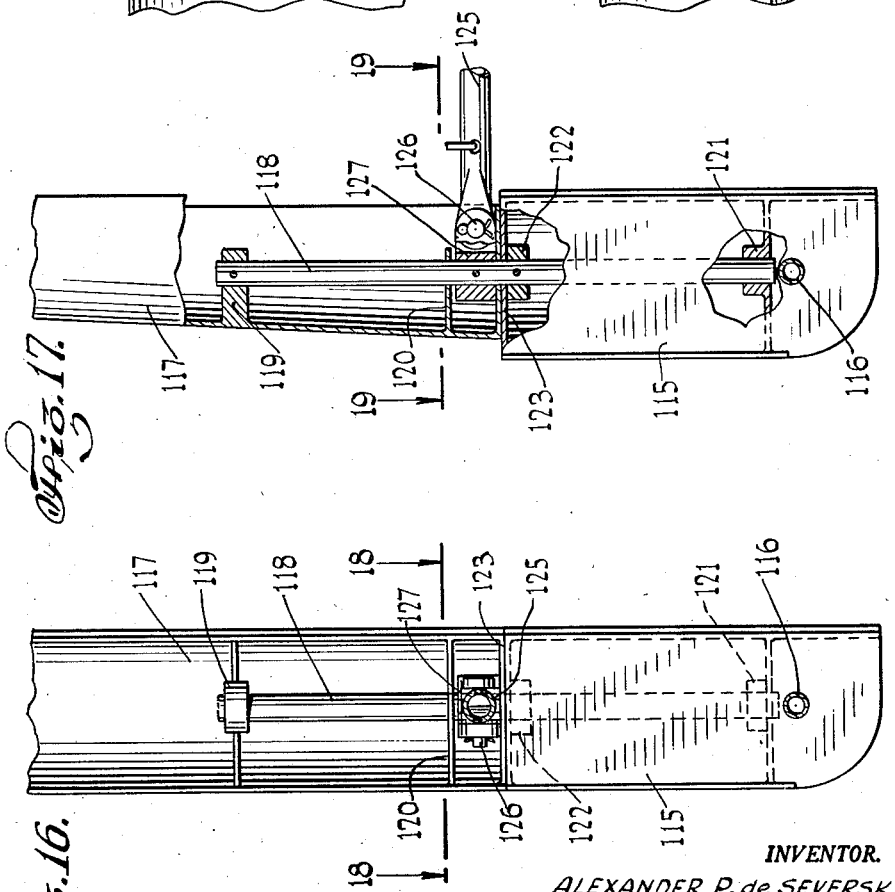

Patented Nov. 27, 1945

2,389,600

UNITED STATES PATENT OFFICE 2,389,600

LIFEBOAT FOR AIRPLANES

Alexander P. de Seversky, New York, N. Y.

Application May 8, 1942, Serial No. 442,145

8 Claims. (Cl. 244—1)

The present invention has for an object to provide a safety device for airplanes whereby an aviator forced down at sea can keep afloat until aid can reach him.

Another object is to provide a float which can serve as a useful part of an aircraft during flight and which has means of locomotion when used as a float.

Another object is to provide a detachable wing structure constructed to include one or several liquidtight compartments which may on occasion serve as gas tanks.

Another object is to provide a detachable wing structure adjusted to serve as a raft having compartments for carying fresh water, food, a radio set, and equipment of various character.

Another object is to provide a wing structure so designed that it may be detached during flight and because of its characteristics will glide to earth with a load carried thereby.

Another object is to provide an airplane having a detachable wing structure of such character that it may carry a substantial load and when detached from the aircraft, will glide to earth carrying that load on a predetermined path, said wing structure being adapted to serve as an emergency float and being equipped with means for effecting locomotion in the water.

The invention aims further to provide a wing structure which forms a normal part of the airplane when in flight and which in an emergency can be used as a float or raft having a sail, keel and rudder.

The invention aims further to provide an emergency float for aircraft having a motor for propulsion.

For the purposes of illustration of the principles of the invention, an embodiment will be described wherein an aircraft is provided with a detachable wing constituting, in flight of the craft, a major supporting element and serving also to provide tanks for fuel and oil and when detached and floating in water constituting a raft or boat equipped with sail, keel, rudder, engine and radio and having a cockpit provided with a protecting cover. The wing is formed with compartments which serve at one time as fuel and oil tanks and at another as flotation chambers with all provisions such as fresh water, food, medicine, and fishing tackle carried therein.

The detachable wing may be constructed to constitute a complete glider embodying principles known in the art whereby when detached it will glide to earth in a predetermined path and land on the water or on the ground with a minimum of shock. The detachable wing structure may even constitute a complete aircraft of the type wherein the necessary characteristics for automatically stabilized flight are present in the design.

The detachable wing may be used to deliver supplies without landing in which case the wing is detached during flight. In the event of a forced landing on water the auxiliary wing may serve to keep the whole craft afloat until it can be salvaged or the wing can be released for separate use as a boat.

The nature and objects of the invention will be better understood from a description of a particular illustrative embodiment for the purposes of which description reference should be had to the accompanying drawings forming a part hereof and in which Figure 1 is a view in front elevation of an airplane embodying the invention.

Fig. 2 is a plan view of the same.

Fig. 3 is a side view with parts omitted.

Fig. 4 is a detail sectional view taken on the line 4—4 of Fig. 3.

Fig. 5 is a detail view partly in section on the line 5—5 of Fig. 3 showing parts of the wing releasing mechanism.

Fig. 5a is a detail view partly in section on the line 5a—5a of Fig. 3.

Fig. 6 is a view in side elevation of the detachable wing adjusted for use as a life boat equipped with a sail.

Fig. 7 is a longitudinal central sectional view of the detachable wing and life boat taken on the line 7—7 of Fig. 2.

Fig. 8 is a perspective view of the central part of the boat equipped for sailing.

Fig. 9 is a detail plan view partly in section of the connection between the mast and boom taken on the line 9—9 of Fig. 8.

Fig. 10 is a detail view in elevation of the connection between the mast and boom.

Fig. 11 is a detail view in elevation of the top of the mast and connections of the sail and radio aerial.

Figs. 12 and 13 are views in elevation of the mast in original and in turned positions.

Figs. 14 and 15 are sectional views taken on the lines 14—14, and 15—15 respectively of Fig. 13.

Figs. 16 and 17 are detail views of the rudder and operating mechanism therefore.

Figs. 18 and 19 are sectional views taken on the line 18—18 of Fig. 16 and on the line of 19—19 of Fig. 17.

Fig. 20 is a plan view of a modified form of wing.

The aircraft to be described for the purposes of illustration is a biplane having upper and lower wings, one of which, preferably the upper wing, is designed to serve normally as a wing and is arranged to be detached from the rest of the aircraft and, when detached, to serve as a life boat.

The fuselage and the other wing may be of such construction as to constitute a completely operative monoplane when the detachable wing is removed.

It is important that the connection between the fuselage and the detachable wing shall be strong and rigid and yet such that the wing can be reliably released in an emergency. It is contemplated that in the particular embodiment illustrated, release of the wing may be desired in different circumstances, on some occasions during flight and on some occasions while on the water. The airplane shown is a fighter plane and in the event of a conflict, it may be desirable to release the auxiliary wing in order to improve the flying characteristics of the plane. On occasion it may be desirable to release the wing in flight in order to deliver provisions carried thereby where landing of the plane as a whole is impossible or undesirable. The connections and the releasing devices shown in the illustrative embodiment are particularly designed for reliability in flight and for reliability of operation in the event that disconnecting is required.

The connection between the auxiliary wing and the fuselage may be of any suitable type. As shown in Figs. 1 and 3, the upper detachable wing 11 is connected to the fuselage by three struts 12, 13, 14. For this purpose, the head rest structure 15 immediately behind the pilot and which constitutes a particularly strong and rigid portion of the craft is made hollow to receive the hollow vertical strut 12. The firewall 15, to which the engine mounting is secured, is constructed with two vertical tubes 16, 17, Fig. 4 to provide strong and rigid support for the two laterally placed vertical struts 13, 14. The struts 12, 13, 14 fit at their upper ends in suitable socket elements 18, 19, 20, formed in the wing structure.

The struts are securely but detachably connected in the wing by means of pins 21, 22, and 23, all of which are connected to a frame 24 to be retracted from their locking position thereby. As shown pin 25 locks the frame 24 in position normally to secure the pins in holding position. The pin 25 can be retracted from locking position by means of a wire 26 which extends downward in front of the strut 12 to a suitable position for operation by the pilot. As the pin 25 is withdrawn the frame is forced forward by a compression spring 27 which is normally compressed between the cross bar of the frame and a supporting bracket in which the frame is slidably mounted.

When the wing 11 is released during flight, it will be carried free of the rest of the airplane by the aerodynamic lift. When released in the water, the rest of the plane will fill with water and sink to leave the wing floating free.

The struts 12, 13, 14 are preferably so arranged that after the wing has been detached they can be retracted into the fuselage. As shown, the struts are held in position by pins 28 carried by a frame 29, the arrangement being the same in principle as that of the pins 21, 22, and 23. Springs 30 normally hold the frame in forward position and the pins in their locking positions in the struts but the pilot can at will grasp the handles 31 and pull the frame rearwardly thus releasing the pins. When the pins are released the struts are retracted by springs 32.

The construction of the wing 11 is such that in flight it will serve effectively as a lifting and supporting wing and also will serve as a storage reservoir for fuel, oil, and cooling liquid for the engine. To this end, the wing is of cellular structure. All inlets and outlets of the tanks are arranged to be closed completely to insure buoyancy when the wing is used as a boat. When the wing is used as a life boat, it has a suitable cockpit and is provided with a sail, engine, keel and rudder.

As shown best in Fig. 8, the central portion is constructed to provide a cockpit 35 with a removable cover 36 which constitutes a portion of the upper sheathing of the wing. Other compartments serve as cupboards 38, 39, 40 for emergency food, water and equipment.

A section of the leading edge is formed as a rigid member adjustable to vertical position to serve as a mast 42. As shown, this mast section is rigidly secured to a hollow rock shaft 43 mounted in sleeves 44 of the wing structure.

A suitably anchored spring 45 engaging an arm 46 on the rock shaft is tensioned to lift the mast section from its horizontal position as a portion of the leading edge of the wing. A latch 47, Fig. 11, which normally holds the mast section in position as the leading edge fairing is released by a pull cord 48 extending through the hollow rock shaft 43 and along within the mast section to the latch.

When the latch is released, the spring initiates the lifting of the mast and if the spring is not strong enough to complete this operation, the pilot pulls the mast to vertical position by the wire 50 which extends from the top of the mast through a pulley or eye 51 secured to the deck by an insulating connection 52 shown in Figs. 2 and 6. The wire 50 not only extends from the top of the mast through the eye 51 and back to the pilot but also extends from the top of the mast through a similar eye 53 connected by an insulator 54 to the wing and then back to the pilot. At the top of the mast, as shown in Fig. 11, the two sections of the wire 50 are connected by insulators 55 to a stud 56 in the mast and these two sections are electrically connected to each other by a conductor 57. The wire 50 and the insulating connections 52 and 54 are positioned in a channel 58 extending along the surface of the wing. This channel may be filled with putty or other suitable plastic to hold the wire releasable therein and to provide a smooth wing surface.

The wire 50 is designed to serve when the mast is lifted in erect position as guy wires and also as an aerial. An insulating section 60 may be provided toward each end of the boat and the portions 61 will then not constitute parts of the aerial. A lead 62 is provided to connect the aerial with a radio set 63 in a compartment beside the pilot. Additional guy wires, such as indicated at 64, may be provided within the mast, to be secured to suitable eyebolts on the deck after the mast is in position.

A boom 65 and sail 66 are housed within the hollow of the mast. As shown, the hollow of the mast is open to one side rather than rearwardly and a special fixture provides for the swinging of the mast rearwardly and to both sides. The mast is formed with a horizontal transverse rib 68, Figs. 8, 9, and 10, and a vertical bolt 69 is supported between this rib and a bracket 70. A clevis member 71, rotatable and slidable on the bolt 69 is formed with a stud 72 extending horizontally, and on this stud a bracket 74 is pivoted for movement in a vertical plane. At its free end, it carries a vertical bolt 75 on which the boom 65 is pivoted to swing in a horizontal plane. When the boom is stored within the mast, the clevis 71 is in the dotted line position, Figs. 9 and 10, and it is held there by virtue of a downwardly extending lug 76 which extends through a corresponding hole in the rib 68. To swing the boom and sail out from within the mast, they are lifted to withdraw the lug 76 from the hole in the rib, the clevis 71 sliding upon the bolt 69 for this purpose. In the outer position, the lug 76 drops down over the outer edge of the rib 68 to hold the parts in this adjusted position. A wedge 77 may be inserted between the bracket 70 and the clevis 71 to prevent release by the lifting effect of the wind on the sail. The sail 60 and therefore the free end of the boom 65 are supported by a clew-line 78 extending over a pulley 79 at the top of the mast and down to a cleat 80 at the lower end of the mast. To hold the free end of the boom, a rope 81 extends from the end of the boom around a hook 82 and forward to the cockpit.

A section 85 of the wing tip is arranged to provide a rudder. It is mounted with suitable controls whereby it can be rotated about a horizontal axis from its horizontal wing-serving position to a vertical rudder position and whereby in this position it can be operated as a rudder from the cockpit.

As shown in Figs. 12 and 13, the section 85 is rigidly secured to a shaft 86 and this shaft in turn is rotatably mounted in the sleeve 87. The sleeve is pivoted at 88 in a suitable bracket for lateral swinging movement for steering the craft. The inner end of the sleeve 87 is formed with a block 89 sliding between upper and lower arcuate ways to provide the necessary controlled lateral movement of the rudder. An arm 90 is secured to the shaft 86 and is arranged to be rotated by a cord 91 to rock the wing tip section 85 from the horizontal wing serving position to the vertical rudder position.

As shown in Fig. 14, an arm 88a on the block 89 carries a spring pressed detent 90a engageable in a suitable notch in the hub of arm 90 to hold the rudder in its vertical position of adjustment after it has been rotated to operative rudder position by the cord 91. The cord may then be left slack to permit the swinging of the rudder.

During flight, the wing section is locked in position by spring-pressed bolts 92 and 93. A cord 94 is provided to retract the bolt 92 and a cord 95, operating through a lever 96, is provided to retract the bolt 93. In order to operate the rudder from the cockpit, cords 98 and 99 are connected to opposite sides of the block 89 and extend around suitably placed guide pulleys. The cords 91, 94, 95, 98, and 99 extend along a channel 97, Fig. 8, within the wing to the cockpit for operation by the pilot.

The details of the joint at the pivot 88 are of conventional and obvious design and need not be further described herein. Preferably all connections are made to exclude water as far as possible. Preferably also the end compartment housing the moving parts is made as small as possible in order that if leakage occurs it will have little effect.

A leeboard or keel is provided to resist lateral drift of the boat; as shown, an edge wing section 100 is hinged to the main body of the wing or boat to permit movement downward to keel-serving position. Suitable latch bolts 101 are provided to hold this wing section 100 in normal position during flight. In addition to these, steel straps 102 are pivoted to the upper inner edge of this hinged section and hooks 103 on the inner ends thereof normally engage in holes 104 in the wing structure further to secure the wing section in position. When the section is moved to keel-serving, drift-resisting vertical position, the hooks 103 engage and lock in recesses 105 and firmly lock the section in position to serve as leeboard or keel.

A strap 106 is shown in Figs. 3 and 8 secured to the wing and extending down to the pilot with a suitable hook 107 to be secured to the belt of the pilot. This strap gives the pilot a connection to the lifeboat so that in emergency he retains connection with the lifeboat.

As shown in Figs. 1 and 8, an outboard motor is housed within a compartment 110, in the leading edge of the wing. The cover 111 is removable to provide access to this compartment and the motor can be removed and suitably attached for operation. The compartment may be of such construction that when the cover 111 is removed, a suitable support for the motor is provided. A chain may be attached to the motor and to the structure within the compartment to prevent losing the motor overboard in case of accident.

If preferred the motor can be mounted centrally and permanently in the wing and a propeller carrying shaft can be connected by a universal joint to the motor. The shaft can be rotatably mounted in a center board with the propeller projecting at the rear end of the center board. In use the center board would be adjustable to inoperative position housed within the wing or to lowered position for use.

In Figs. 16 to 19 there is shown a modified form of mast wherein the mast is pivotally connected for movement to vertical position as in the embodiment previously described but wherein the major portion of the mast is rotatable upon its own axis. As here shown the mast is made in two sections. The lower section 115 of which is pivoted to the body of the wing to swing about an axis 116 as in the embodiment previously described. The upper section 117 is connected to the lower section 115 by an axial shaft 118 rigidly secured in brackets 119 and 120 of the upper section rotatable in a bracket 121 forming a part of the lower mast section. A collar 122 secured to the shaft 118 bears against a cross piece 123 of the lower mast section to inhibit any upward movement of the upper section. The boom 125 is pivoted on a horizontal pin 126 in a clevis 127 secured to the shaft 118. By this arrangement the boom has the necessary vertical movement relative to the mast and it swings laterally with the mast in use.

The foregoing particular description is illustrative merely and is not intended as defining the limits of the invention. Various modifications can be made without departing from the spirit of the invention, as defined in the appended claims. For example the detachable wing can be designed to have automatic stability whereby it will soar to earth. It may even be a complete all-wing airplane of the Northrop type, and may have control surfaces adapted to be set to determine the path of soaring.

I claim:

1. In an airplane, a detachable wing constructed to serve as a supporting wing in flight, and as a raft in the water, said wing being constructed to include a main body portion, and an edge mast section, means adjustably mounting said section on said main body portion to normally form a portion of one edge of the wing and for movement from normal position to upright position to constitute a mast, together with means for holding the edge mast section in position as edge section of the wing and means for holding said section in upright position in the wing.

2. In an airplane, a detachable wing constructed to serve as a supporting wing in flight and as a raft in the water, said wing being constructed to include a main body portion formed with liquidtight sections, a mast pivotally connected to the body portion and movable from normal position to upright position, a boom housed with said mast section and pivotally connected thereto whereby the mast and boom can support a sail.

3. In an airplane, a detachable wing constructed to serve as a supporting wing in flight and as a raft in the water, said wing being constructed to include a main body portion formed with liquidtight sections, a mast section normally forming a portion of one edge on the wing, pivotally connected to the body portion and movable from normal position to upright position to constitute a mast, a boom housed within said mast section and pivotally connected thereto whereby the mast section and boom can support a sail.

4. In an airplane, a detachable wing constructed to serve as a supporting wing in flight and as a raft in the water, said wing being constructed to include a main body portion formed with liquidtight section and compartments with moveable covers, one of which is adapted to serve as a cockpit, a mast section normally forming a portion of one edge of the wing, pivotally connected to the body portion and movable from normal position to upright position to constitute a mast, a boom housed within said mast section and pivotally connected thereto whereby the mast section and boom can support a sail, a sail folded with said boom within said edge mast section and connected to the edge mast section and boom, a keel element hinged to the main body portion and normally forming a part of the wing but movable downward to form a drift-resisting keel, a wing tip section secured to said wing normally constituting a wing tip but adjustable to position at a right angle to the plane of said wing and movable laterally about a vertical axis, when so adjusted, to serve as a steering rudder.

5. In an airplane, a detachable wing constructed to serve as a supporting wing in flight and as a raft in the water, said wing being constructed to include a main body portion formed with liquidtight sections, a leading edge fairing of the wing pivotally connected to the body portion and movable from normal position to upright position to constitute a mast, a boom housed within said mast section and pivotally connected thereto whereby the mast section and boom can support a sail, a sail folded with said boom within said mast section and connected to the mast section and boom, a keel element hinged to the main body portion and normally forming a continuous part of the wing but movable downward to form a drift-resisting keel, a wing tip section secured to the main body portion normally constituting a wing tip but adjustable to position at a right angle to the plane of the wing and movable laterally about a vertical axis, when so adjusted, to serve as a steering rudder, a radio antenna connected to the mast section and attachable to the main body portion to serve both as a guy wire and as an antenna, and a radio set mounted in a compartment of the main body.

6. In an airplane, a detachable wing constructed to serve as a supporting wing in flight and as a raft in the water, said wing being constructed to include a main body portion formed with liquidtight sections and a compartment adapted to serve as a cockpit, a keel element hinged to the main body portion and normally forming a continuous part of the wing but movable downward to form a drift-resisting keel, a wing tip section movably connected to the main body portion normally constituting a wing tip but adjustable to position at a right angle to the plane of the wing and movable laterally about a vertical axis, when so adjusted, to serve as a steering rudder, a motor compartment formed in said main body portion, and a motor therein.

7. In an airplane a detachable wing constructed to serve as a supporting wing in flight, and as a gas tank, and formed to constitute a glider when disconnected, said wing comprising a mast section shaped to form a portion of the wing at the surface thereof, means for securing said mast section in position in the wing to constitute a continuous portion thereof or, alternatively, in an upright position to support a sail.

8. An airplane having a detachable wing, as defined in claim 1, and having means for securing said wing in operative position, which means is constructed and arranged to permit detachment during flight.

ALEXANDER P. DE SEVERSKY.